Patented June 18, 1929.

1,717,723

UNITED STATES PATENT OFFICE.

JOHN OPPIE McCALL, OF LARCHMONT, NEW YORK, ASSIGNOR TO CALSODENT COMPANY, INC., OF NEW YORK, N. Y., A CORPORATION OF NEW YORK.

MEANS FOR AND METHOD OF DETECTING AND CORRECTING MOUTH ACIDITY.

No Drawing.   Application filed April 9, 1927. Serial No. 182,538.

My invention relates to means for detecting and correcting mouth acidity and has for an object to provide a material which may be used in solution as a mouth wash to indicate the condition of the mouth and also to correct such conditions as may result in or from the decay of teeth, or other mouth diseases.

It has long been established that acids of various kinds are a prime cause of the decay of teeth, and also that acid conditions are not only associated with, but play an important part in producing diseases of the gums. For this reason it is desirable to test the condition of the mouth periodically, so as to detect any tendency toward acid conditions and prevent or correct such conditions.

An indicator such as litmus paper has heretofore been used, but its action is sluggish and obviously inaccurate, because the color change which takes place with a change from alkaline to acid reaction, is not sharp in dilute solutions, also it cannot be brought into contact with acid contained in minute crevices in the teeth. Brom-thymol-blue is recognized as an excellent indicator for testing acidity of saliva out of the mouth, but the color change is slight in degree and the indication must be determined by careful comparison with a standard solution. This renders it unsuitable to be used if taken into the mouth.

The examination of saliva outside of the mouth provides a very incomplete test. I have found by my studies that the only reliable way of determining the presence of absence of acid in the mouth is by means of a solution containing a suitable indicator which can be taken into the mouth and be brought into intimate contact with minute traces of acid around the teeth, and around other surfaces in the mouth (such as artificial appliances therein), and in the crevices and cavities in the teeth. It is also necessary that the solution be kept in contact with the surfaces in the mouth for an appreciable period of time.

I am aware that certain solutions of phenolphthalein have been employed in the mouth to detect acidity, on the principle that an acid condition will change the color of phenolphthalein from a normal red to water-white transparency. Because of chemical characteristics of phenol-phthalein and of mucin, which is a normal constituent of mouth fluids, an apparent acidity is indicated even when the mouth fluids are neutral or even alkaline, and hence it is necessary to add an excess of alkali to the solution in order to offset the influence of the mucin. However, phenolphthalein is not an infallible indicator even with the addition of sodium hydroxide or a similar alkaline agent, because it is affected by carbon dioxide and ammonia, both of which are normally found in the mouth. Furthermore, phenolphthalein is not soluble in water and it must be dissolved in alcohol before the solution may be mixed with water.

Another indicator which may be used in the mouth is Congo red. Congo red like phenolphthalein changes color in the presence of an acid. Unlike phenol-phthalein, however, it is not affected by ammonia or carbon dioxide. However, if Congo red be used alone, it does not serve as a good indicator because it fails to give a sharp reaction to the presence of acid.

I have found by experiment that the difficulties inherent in the two indicators when used separately, are avoided when the indicators are combined. Thus in a combination of the two indicators the phenolphthalein constituent sharpens the reaction of the Congo red and the latter, in turn, overcomes the neutralizing effect of carbon dioxide and ammonia on phenolphthalein. Furthermore, by combining with the two indicators an excess of alkali, the compound may be reduced to a dry granular material readily soluble in water, while the alkaline constituent also serves to neutralize and correct acid conditions in the mouth, so that repeated use of the product, when dissolved, will keep the mouth in a clean and healthy condition. In combining Congo red with phenolphthalein I find it advisable to use a greater proportion of phenolphthalein than of Congo red. Very satisfactory results are obtained with a mixture of eight parts by weight of phenolphthalein to three parts of Congo red. Various alkaline constituents could be mixed with the indicators, but I prefer to use calcium oxide and ammonium carbonate. The ammonium carbonate serves only as a neutralizer of acid conditions of the mouth but also serves to increase the brilliancy of color of the compound.

Although the ingredients and the amounts of the same in my improved salts may be varied, the following has been found satisfactory:

| | |
|---|---|
| Sodium chloride | 1 pound |
| Calcium oxide | 100 grains |
| Ammonium carbonate | 8 grains |
| Phenolphthalein | 8 grains |
| Congo red | 3 grains |

To these salts and alkali may be added suitable aromatics and flavoring oils. The sodium chloride is provided for its cleansing qualities.

In use, approximately a third of a teaspoonful of the salt is dissolved in a full glass of water, producing a solution having a strong red color. A measured quantity, usually a tablespoonful of the solution, is then taken into the mouth and held there for ten to fifteen seconds. If the solution is colorless when expectorated it indicates that there is sufficient acidity in the mouth to denote an unclean and unhealthy condition. The mouth should then be repeatedly washed with similar measured quantities of the solution until the solution when expectorated shows a definite pink color indicating that the acid has been neutralized and that the mouth is reasonably clean.

I have thus provided a mouth wash which not only corrects the conditions of the mouth but also automatically indicates the amount of treatment the mouth should receive.

By using a dry granular material instead of a liquid I avoid the necessity of employing an alcoholic solution and provide a material which can be kept permanently in greater concentration and used as needed by dissolving it in water to provide the desired mouth wash. While sodium hydroxide could be used for the alkaline constituent in place of calcium oxide and ammonium carbonate, a disadvantage of using the sodium hydroxide lies in the fact that the latter tends to produce a caustic solution which is highly objectionable if too strong a concentration is used. By employing calcium oxide and ammonium carbonate greater latitude is permissible in forming the solution, because these alkaline constituents are not caustic even if used in greater concentration than indicated.

I am aware that other alkaline constituents could be used and hence I do not limit my invention to the use of calcium oxide and ammonium carbonate with phenolphthalein and Congo red.

I claim:

1. Means for detecting acidity in the mouth, comprising a dry salt soluble in water, said salt containing phenolphthalein and Congo red in approximately the proportions of eight grains of phenolphthalein to three grains of Congo red.

2. Means for detecting and correcting acidity in the mouth and surfaces therein, comprising a dry salt soluble in water, said salt containing phenolphthalein, Congo red, and an excess of alkali.

3. Means for detecting and correcting acidity in the mouth and surfaces therein, which comprises a dry salt containing Congo red, phenolphthalein in excess of the Congo red, and an excess of alkali, the alkali being in such quantity as to permit a reaction to occur in an acid mouth secretion.

4. Means for detecting and correcting acidity in the mouth and surfaces therein, comprising sodium chloride, phenolphthalein, Congo red and an excess of alkali, the alkali being in such quantity as to permit a reaction to occur in an acid mouth secretion.

5. Means for detecting and correcting acidity in the mouth and the surfaces therein, comprising a dry salt soluble in water, said salt including the following ingredients and approximate proportions:

| | |
|---|---|
| Sodium chloride | 1 pound |
| Calcium oxide | 100 grains |
| Ammonium carbonate | 8 grains |
| Phenolphthalein | 8 grains |
| Congo red | 3 grains |

6. The herein described method of testing and correcting acidity in the mouth and surfaces therein which consists in dissolving in water, a salt containing phenolphthalein, Congo red, and an alkali constituent, applying a measured quantity of said solution to the mouth for a measured period of time, expectorating the applied solution, and repeating the application until the solution expectorated from the mouth shows no material change in color.

Signed at New York city, in the county of New York and State of New York, this second day of April A. D. 1927.

JOHN OPPIE McCALL.